Aug. 7, 1956 W. A. SCHWENKER 2,758,124
CONTINUOUS HYDROLYSIS OF ORGANOHALOGENOSILANES
Filed April 11, 1952
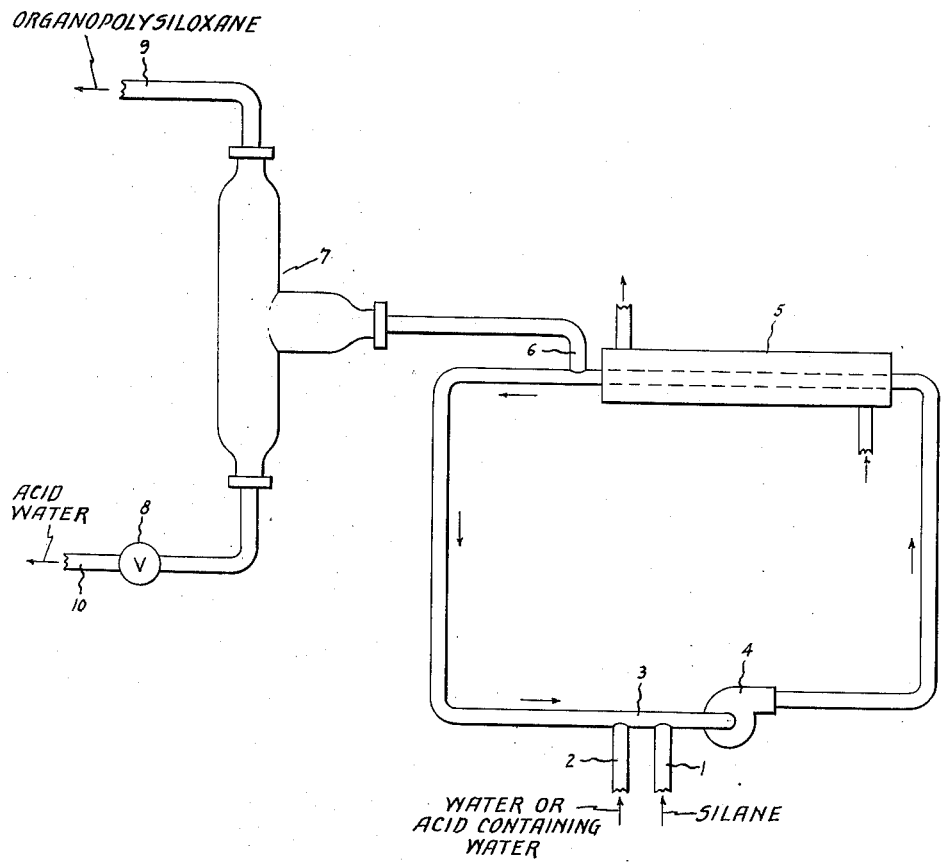
Inventor:
William A. Schwenker,
by [signature]
His Attorney.

United States Patent Office 2,758,124
Patented Aug. 7, 1956

2,758,124

CONTINUOUS HYDROLYSIS OF ORGANO-HALOGENOSILANES

William A. Schwenker, Ballston Lake, N. Y., assignor to General Electric Company, a corporation of New York Application April 11, 1952, Serial No. 281,716

5 Claims. (Cl. 260—448.2)

This invention is concerned with a continuous process for preparing organopolysiloxanes. More particularly, the invention relates to a process for continuously hydrolyzing an organochlorosilane which comprises (1) simultaneously passing a mixture of an organochlorosilane and water which may contain up to about 32 percent, by weight, HCl (based on the total weight of water and HCl) into a circulating system, (2) continuing said introduction of acid-free or acid-containing water and organochlorosilane until partial overflow of the formed organopolysiloxane and acid-containing water of greater HCl concentration (than the original feed comprised) is effected, (3) removing said overflow materials and separating the formed organopolysiloxane from the acid-containing water while at the same time recycling the remaining high-acid content water and residual organopolysiloxane separated from the overflow so as to diffuse the same into the incoming feed of water or lower acid-containing water and organochlorosilane.

Organochlorosilanes, for example, methyltrichlorosilane, dimethyldichlorosilane, or mixtures of dimethyldichlorosilane and other organochlorosilanes, for example, methyltrichlorosilane, diphenyldichlorosilane, and phenyltrichlorosilane, have been hydrolyzed in the past by means of a batch process to obtain the corresponding organopolysiloxanes. However, batch processing of, for instance, organochlorosilanes, has not been satisfactory for several reasons. In the first place, it has generally been found that the use of batch hydrolysis of organochlorosilanes, such as methylchlorosilanes, is expensive and does not give a complete hydrolysis since, under conditions where economical recovery of the hydrochloric acid is desired, there appears to be some occlusion of unhydrolyzed methylchlorosilane in globules of the hydrolyzed material. In addition, it has not been possible to obtain satisfactorily reproducible results using the batch process. To obtain the low viscosity products which are most desirable in hydrolyzing methylchlorosilanes using the batch process, it has been necessary to use special conditions, for example, the use of lower temperatures of the order of about 10 to 15° C. In addition lower contact times between the water of hydrolysis and the methylchlorosilane have also been found essential. Even with these conditions, the results have been erratic and great difficulty has been encountered in obtaining the low molecular weight products which are most desirable when hydrolyzing methylchlorosilanes, particularly, dimethyldichlorosilane.

Because of the inherent defects in the batch hydrolysis of methylchlorosilanes, attempts have been made to adapt such hydrolysis to a continuous process. One such attempt is embodied in U. S. Patent 2,483,963 in which an organochlorosilane and steam are fed simultaneously into a system whereby continuous hydrolysis of the chlorosilane is effected. However, even this type of continuous hydrolysis is subject to several disadvantages. One of these is that the feed ratio of the chlorosilane and the steam is critical. If the exact stoichiometric ratio of steam to chlorosilanes fed is not maintained, either steam, water or organochlorosilane must leave the system in one of the effluent streams causing undesirable contamination of either the oils produced or the gaseous HCl effluent. In addition, it has been found that in this particular hydrolysis system, the effluent HCl formed during the reaction carries over undesirably large amounts of unhydrolyzed organohalogenosilane thus contaminating the HCl so that further purification of the HCl effluent gases is necessary if one is to be able to use the by-product HCl for other reactions. Moreover, the yields by means of this system although they are quite good still do not approach the optimum yields which might be expected. Although yields of 99.2 percent are described in this patent, it should be noted that this does not include an additional silane carryover of 7.26 percent. It would seem that this silane carryover is lost and should be included in the yield figure thus materially reducing the actual yield of organopolysiloxane formed. Finally, the concurrent use of steam and organohalogenosilane gives products whose viscosities and molecular weight, particularly in connection with the hydrolysis of dimethyldichlorosilane, are higher than is usually desired.

I have now discovered that all the disadvantages of batch operation and of the particular continuous hydrolysis described in U. S. Patent 2,483,963 may be obviated and that organopolysiloxanes having desirable properties in good yields can be obtained. In accordance with my invention, organohalogenosilanes and water or water containing hydrochloric acid in various concentrations are continuously introduced at controlled rates separately to a hydrolysis system which comprises essentially a pump, for instance, a centrifugal pump, and a heat exchanger piped together in a loop. The pump is used for mixing the reactants intimately and to circulate the resulting hydrolyzed product or organopolysiloxanes and acid through the heat exchanger at a rate high enough to give good heat transfer. In operation, referring specifically to the hydrolysis of dimethyldichlorosilane, it being apparent to persons skilled in the art that such a description applies to the hydrolysis of the other organohalogenosilanes described above, dimethyldichlorosilane and water (or water containing hydrochloric acid in various concentrations) are continuously introduced at specified rates separately to the circulating loop near the pump inlet in proportions such that the chlorosilanes are completely hydrolyzed and the resulting hydrogen chloride formed dissolves in the excess water to form hydrochloric acid of concentrations ranging, for instance, from about 25 to 36 percent. The exothermic heat of solution of hydrogen chloride in the water is removed by means of cooling water in the heat exchanger.

The operating temperature at which the hydrolysis may be carried out may vary, for example, from about 25 to 80° C., depending upon the concentration of the acid produced. The volume in the circulating loop is preferably kept low in order to keep at a minimum the contact time between the formed organopolysiloxane and HCl present in the loop. As will be more particularly described below, a portion of the reaction products circulating through the loop will overflow into an organopolysiloxane-acid separator (e. g., a methylpolysiloxane-acid separator), where gravity settling is accomplished and following this the upper layer hydrolyzed organopolysiloxane product, for instance, methylpolysiloxane, and lower layer acid are drawn off separately.

By means of the above-described system for continuously hydrolyzing organohalogenosilanes, it is possible to reproduce hydrolysis results on the same hydrolyzable material within fairly narrow limits. The feed ratios of water or acid-containing water (which for brevity will hereinafter in the specification and claims be referred to as "water") and organohalogenosilane are not critical, and may be varied to give a wide range of effluent acid concentrations ranging, for example, from about 25 to 36 percent HCl with little effect on the quality of the final product. In this respect, the acid-containing water is relatively free of any silicon composition and can be used essentially in this form without further purification for other purposes. If desired, the by-product hydrochloric acid can be distilled in a separate operation to obtain gaseous HCl and a 21 percent hydrochloric acid azeotrope; the latter azeotrope can then be recycled as a feed to the continuous hydrolysis unit. Such a system enables independent operation of the hydrolysis unit and the HCl user, since the HCl may be stored as acid and distilled when needed. Thus, flexibility of operation and purity of HCl are attained.

My above-identified process also permits obtaining yields of completely hydrolyzed organopolysiloxanes ranging from about 98 to over 99 percent of the theoretical yields. Moreover, viscosities as low as 5.9 centistokes are obtainable when hydrolyzing, for instance, dimethyldichlorosilane in my continuous process. These low viscosities are indicative of low molecular weight products which are highly desirable in the hydrolyzed product for further processing of the latter materials to make silicone oils or silicone rubbers. Moreover, my process can be utilized to hydrolyze materials which produce solids upon hydrolysis such as, for example, methyltrichlorosilane. The solids thus obtained are in the form of finely divided materials, which can be discharged as an effluent mixture of the latter and the acid-containing water directly into a receptacle.

As pointed out above, the temperature at which my continuous process for hydrolyzing organohalogenosilanes is carried out can be varied from about room temperature, for instance, from about 25° to as high as 80° C. The feed rates of the organohalogenosilanes and water are not critical and can be varied widely. It is generally desirable that a large excess of water above that required for complete hydrolysis of the organohalogenosilane be employed in combination with the hydrolyzable materials in order to permit adequate solution of the formed HCl. Where water alone is used with the organohalogenosilane, referring in the following instances to the specific case where dimethyldichlorosilane is being hydrolyzed, it is generally desirable to maintain and use at least 8 mols of water (which will give 36 percent HCl in the effluent acid) per mol of dimethyldichlorosilane when feeding the materials into the circulating system. Where hydrochloric acid of 25 percent concentration or above is desired in the effluent stream, at most 13 mols water per mol dimethyldichlorosilane should be employed. If one desires a higher acid content in the effluent acid-containing water, for instance, up to 36 percent hydrochloric acid solution, the amount of water is of the order of at least about 8 mols water per mol dimethyldichlorosilane. The upper limit of water employed, of course, will be dictated by the economics of the particular continuous hydrolysis system employed. Ratios of water to organochlorosilane which are too high are undesirable because it may bring the concentration of HCl in the effluent acid below 25%. This is detrimental because it hinders ready and complete separation of the formed organopolysiloxane from the acid effluent and also lessens the value of the effluent acid in future processing. In general, the effluent hydrochloric acid concentration is preferably of the order of from 25 to 36 percent acid. As will be apparent to those skilled in the art, the effluent acid strength will be determined by the feed ratio of the chlorosilane to water or chlorosilane to acid-containg water. When hydrolyzing, e. g., methyltrichlorosilane, acid-containing water is advantageously employed, while keeping the weight ratio of acid-containing water in the feed to methyltrichlorosilane relatively high in order to encourage flotation and easy movement of the hydrolyzed solid particles of methyl polysiloxane. Generally, the amount of water used will vary with the type of organochlorosilane or mixture of organochlorosilanes employed; the amount is advantageously that necessary to effect complete hydrolysis of all silicon-bonded chlorine atoms in the silane. Enough excess water is employed in order to prevent evolution of gaseous HCl formed in the reaction. If solid organopolysiloxanes are the resulting product, sufficient additional water should be present in the system to effect flotation of the solid organopolysiloxane and to prevent plugging of the hydrolysis equipment. It is therefore apparent that no general ratio of water to silane can be postulated in the hydrolysis of all silanes, since as pointed out above, all the considerations described previously must be taken into account for each type of hydrolyzable silane.

The recycle ratio, that is, the ratio of recirculating water and organopolysiloxane, containing whatever contamination may be present (for example, slight amounts of unhydrolyzed organohalogenosilane), to the weight of materials fed is preferably of the order of 20 to 1 or higher, for example, as high as 40 to 1. This can be adjusted by the rate of feed and by the rate of circulation of the ingredients and products. A recycle ratio of the order of about 20 to 1 has been found satisfactory and such a ratio insures complete hydrolysis of the chlorosilane fed into the system whereby the average silane molecule is subjected to at least 20 passes through the pump before overflowing from the system. This insures complete reaction and optimum yields.

In order that those skilled in the art may better understand how the present invention may be practiced, the following examples are given by way of illustration and not by way of limitation. The term "silane" will be used to refer to the organochlorosilane and mixture of organochlorosilanes employed in the specific example described below. The accompanying drawing is a representative flow diagram illustrating the manner in which the present invention may be practiced and illustrating equipment which can be adapted for the purpose.

Referring specifically to the accompanying drawing, and taking dimethyldichlorosilane as an example of the silane liquid, the dimethyldichlorosilane is introduced at around room temperature into inlet 1 simultaneously with the water or acid-containing water which is introduced at inlet 2. The silane and water enter the main circulatory stream 3, pass through simultaneously to the centrifugal pump 4, where the mixture is subjected to intimate mixing and shearing whereby almost complete hydrolysis of the silane liquid is accomplished either in the circulating pump or shortly thereafter due to the action of the pump. Thereafter, the mixture of ingredients is continued around the loop in the direction shown by the arrows until it comes to the cooler or heat-exchanger 5. The temperature of the circulatory system is materially reduced at this point so that undue volatilization of the anhydrous HCl will be minimized. The circulating materials are then continued through the loop until they come to an overflow device 6 whereby a portion of the material circulating through the loop overflows into an organopolysiloxane-acid separator 7. The overflow to the separator is then in turn separated to obtain from the upper portion 9 of the separator the organopolysiloxane, in the case of the hydrolysis of dimethyldichlorosilane, liquid polydimethylsiloxane, and a lower layer from the bottom of the separator which is essentially acid-containing water in which the acid concentration is anywhere from about 25 to 36 percent. The discharge from the separator of acid and organopolysiloxane may be controlled manually by a throttling valve 8 in the acid effluent line or by means of a liquid level control positioned at the interface between the acid and the organopolysiloxane in the separator and actuating a valve in the acid discharge line. The bottom portion of the separator device 7 which comprises essentially the acid water is then removed. Preferably a recycle ratio, that is, the weight of recirculating fluid to the rate of material fed, of the order of 20 to 1 is maintained. This ratio insures complete hydrolysis of the chlorosilane fed so that the average silane molecule is subjected to at least 20 passes through the pump before overflowing from the system.

The portion of the reaction product overflowing at the overflow 6 consists principally of the polydimethylsiloxane and the acid-containing water. The amount of unhydrolyzed material in this mixture is essentially negligible and becomes infinitesimal as the process continues to operate. The organopolysiloxane removed at the takeoff 9 is essentially free of unhydrolyzed material or of acid. Any small amounts of acid present can be readily neutralized by passing the organopolysiloxane fluid through a neutralizing bath consisting, for example, of a dilute solution of sodium hydroxide, and separating the organopolysiloxane from the bath to give essentially pure acid-free organopolysiloxane product. The acid-water mixture withdrawn at the lower part 10 of the separating or settling chamber 7 has an acid content which is higher than any acid-containing water which may be introduced originally into the system. The acid content of this layer may be reduced by distillation to obtain substantially anhydrous HCl and acid-containing water of lower concentration, for example, about 21 to 23 percent acid.

A typical apparatus which can be employed in the practice of the present invention and which was used in connection with the examples described below included equipment having a centrifugal pump of glass construction operating at a rate of about 1750 R. P. M., 10 gallons per minute maximum, and having 10 feet total dynamic head. The heat exchanger consisted of 7 feet of jacketed 1-inch acid-resistant pipe containing water as a coolant and flowing around the aforesaid pipe. The overflow separator consisted of a 2-inch glass pipe in the shape of a T with a volume of about 1.5 liters.

EXAMPLE 1

Employing the equipment described above, dimethyldichlorosilane containing about 0.46 mol percent methyltrichlorosilane was introduced simultaneously with water into the above-described equipment. The average feed rate of the chlorosilanes was about 23.8 lbs. per hour, while the rate of feed of the water was about 37.6 lbs. per hour. The temperature at which the hydrolysis reaction was carried out was about 61 to 62° C. The continuous introduction and circulation of the chlorosilanes and water was maintained for about 7 hours during which time about 98.6 lbs. of a polydimethylsiloxane oil was produced. The viscosity of this oil was approximately 6 centistokes and the yield was essentially quantitative. The acid strength of the water-acid mixture removed from the system was about 28 percent HCl.

EXAMPLE 2

A mixture of chlorosilanes consisting of 94.7 mol percent methyl hydrogen dichlorosilane and 5.3 mol percent trimethylchlorosilane was introduced with water into the same equipment as described above. The average feed rate for the chlorosilanes was 24 lbs. per hour while the average feed rate for the water was about 38 lbs. per hour. The operating temperature was about 35° C. and the length of continuous introduction and circulation of ingredients and recycling was for about 10 hours. There was thus produced a silicone oil in essentially quantitative yield which had a viscosity of about 9 centistokes. The acid-water mixture removed from separator had an acid strength of about 29 percent HCl. This silicone oil was a chain-stopped silicone oil of the formula

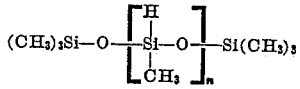

where $n$ is an integer greater than 1.

EXAMPLE 3

In this example the following continuous hydrolyses were carried out with dimethyldichlorosilane. In run No. 1 and run No. 2 there was present 1.4 mol percent methyltrichlorosilane, and in run No. 3 the dimethyldichlorosilane contained 0.5 mol percent methyltrichlorosilane. Water and chlorosilanes were introduced continuously at specified rates and the mixture of ingredients and by-products circulated and separated in the same manner as described in Examples 1 and 2. The conditions of the hydrolysis as well as the products obtained and properties of some of the products are described below in Table I.

*Table I*

|  | Run No. 1 | Run No. 2 | Run No. 3 |
|---|---|---|---|
| Average feed rates, lbs./hr.: |  |  |  |
| Chlorosilanes | 16 | 20 | 20 |
| Water | 32 | 40 | 40 |
| Acid Strength of Overflow Water (Percent HCl) | 30 | 30.5 | 28 |
| Operating Temperature (° C.) | 60 | 69 | 62 |
| Length of Run (hours) | 3 | 3.5 | 7.17 |
| Pounds polydimethylsiloxane oil produced | 33.8 | 44.3 | 96.8 |
| Percent polydimethylsiloxane oil recovered | 99.2 | 98.7 | 98.8 |
| Viscosity of oil (centistokes) | 5.9 | 6.2 | 5.9 |
| Percent polydimethylsiloxane in acid overflow | 0.22 | 0.29 | 0.25 |

EXAMPLE 4

In this example is illustrated the use of acid-containing water which is introduced simultaneously with the silane. More particularly, dimethyldichlorosilane containing 0.4 mol percent methyltrichlorosilane was introduced simultaneously into the system with water containing 22 percent, by weight, HCl. Because of the acid content of the water, the average ratio of introduced silane and water per hour was increased so that there was being used 20 lbs. of the dimethyldichlorosilane (containing the methyltrichlorosilane) to 119 lbs. of the acid-containing water. This feed rate ratio was of the order of about 1 to 6 which indicates the use of a larger amount of water than was employed in Examples 1 to 3 when acid-free water was introduced into the circulating system. The operating temperature during the run was somewhat less than 23° C. and the run with the recycling feature was carried out for about 1¼ hours. The acid strength of the overflow water separated in the settling chamber from the polydimethylsiloxane oil was about 32 percent. The viscosity of the polydimethylsiloxane oil was 4.6.

EXAMPLE 5

In this example, essentially pure methyltrichlorosilane was fed into the same system described above with water containing 25 percent, by weight, HCl at such a rate that the methyltrichlorosilane was fed at the rate of about 9 lgs. per hour while the acid-containing water was fed at a rate of about 210 lbs. per hour. The run was conducted at a temperature of about 21° C. for about 50 minutes There was thus obtained a mixture comprising finely divided particles which comprised a methylpolysiloxane of the formula $(CH_3SiO_{1.5})_n$ and which readily separated from and floated on top of the acid leaving the system in the separating or settling chamber.

EXAMPLE 6

In the reaction of methyl chloride with silicon in the manner described in Rochow Patent 2,380,995, there is produced, in addition to the various methylchlorosilanes, a higher boiling residue which consists essentially of methylchlorodisilanes in which the number of methyl groups and chlorine atoms around the silicon atoms may be varied. There is also produced a small amount of higher polysilanes which together with the disilanes are referred to as the "methylchlorosilane residue." This methylchlorosilane residue was fed with water containing about 21 percent HCl to the system described above. The average feed rate was 1 lb. per hour for the chlorosilane residue and 250 lbs. per hour for the 21 percent HCl-water. The operating temperature was about 45° C. and the length of time during which the run was conducted was about 7 hrs. There was thus obtained a granular solid which readily separated from and floated on top of the acid leaving the system. The acid strength of the HCl obtained from the system was about 23 percent concentration.

It will, of course, be apparent to those skilled in the art that other organochlorosilanes in addition to those described above may be hydrolyzed in a manner similar to that described in the foregoing examples without departing from the scope of the invention. Among such organochlorosilanes may be mentioned compounds corresponding to the general formula $R_nSiCl_{4-n}$, where $n$ is an integer equal to at least 1 and not more than 3 and R is a monovalent hydrocarbon radical, for instance, alkyl, aryl, aralkyl, alkaryl, halogenated, hydrocarbon radicals, etc. Thus, R may be, for example, methyl, ethyl, propyl, isopropyl, butyl, phenyl, tolyl, benzyl, chlorophenyl, etc. Mixtures of the above organochlorosilanes may also be used, or other organochlorosilanes, e. g., methyldichlorosilane, or even $SiCl_4$, may be added to the organochlorosilane composition. Preferably, in the above type formula R represents a lower alkyl radical or a monocyclic aryl hydrocarbon radical.

Many of the organopolysiloxanes produced in accordance with the present invention are useful as lubricating oils or they can be further processed to make silicon rubbers having good heat resistance. Alternatively, the methylpolysiloxanes, particularly those produced from the hydrolysis of methyltrichlorosilane can be intercondensed with other organopolysiloxanes to make useful resins, rubbers and oils having good heat resistance and use in various applications including insulating and molding applications.

What I claim as new and desire to secure by Letters Patent in the United States is:

1. The process of preparing organopolysiloxanes from organochlorosilanes of the type $R_nSiCl_{4-n}$ where R is a member of the class consisting of alkyl and aryl radicals and $n$ has a value of from 1 to 3, which process comprises (1) introducing water and an organochlorosilane of the above type into a circulating system to effect hydrolysis of the organochlorosilane and to form a mixture comprising an organopolysiloxane and an acid-containing water, there being used sufficient water so that (a) the resulting hydrochloric acid has a concentration range of from 25 to 36%, (b) essentially all the silicon-bonded chlorine atoms are hydrolyzed, and (c) evolution of gaseous HCl is substantially repressed, (2) continuing said introduction of water and organochlorosilane until partial overflow of the formed organopolysiloxane and acid-containing water is effected, (3) separating the formed organopolysiloxane from the acid-containing water, (4) recycling the residual acid-containing water substantially free of any silicon composition and diffusing it into freshly fed water and organochlorosilane introduced into the circulating system.

2. The process as in claim 1 in which the organochlorosilane is a methylchlorosilane and the organopolysiloxane formed is a methylpolysiloxane.

3. The process of preparing a methylpolysiloxane from dimethyldichlorosilane which comprises (1) introducing dimethyldichlorosilane and water rendered acidic with HCl into a circulating system to effect hydrolysis of the dimethyldichlorosilane and to form a mixture comprising a methylpolysiloxane and acid-containing water, there being used a sufficient amount of the originally introduced acidified water so that (a) the hydrogen chloride present in the water after hydrolysis has taken place is within the concentration range of from 25 to 36%, (b) essentially all the silicon-bonded chlorine atoms are hydrolyzed, and (c) evolution of gaseous HCl is substantially repressed, (2) continuing said introduction of acidified water and dimethyldichlorosilane until partial overflow of the formed methylpolysiloxane and acid-containing water is effected, (3) separating the formed methylpolysiloxane from the acid-containing water, (4) recycling the residual acid-containing water substantially free of any silicon composition and diffusing it into freshly fed acidified water and dimethyldichlorosilane introduced into the circulating system.

4. The process of preparing a methylpolysiloxane from dimethyldichlorosilane as in claim 3 in which the acidified water introduced at the beginning of the reaction and fed continuously into the circulating system other than the acidified water being recycled comprises water containing at least 22%, by weight, thereof HCl.

5. The process of preparing a methylpolysiloxane from methyltrichlorosilane which comprises (1) introducing methyltrichlorosilane and dilute hydrochloric acid of at least 22% concentration HCl into a circulating system to effect hydrolysis of the methyltrichlorosilane and to form a mixture comprising finely divided particles of the methylpolysiloxane and acid-containing water of higher acid concentration than employed originally, the amount of acidified water used being present in an amount equal to at least 10 mols of the latter per mol of methyltrichlorosilane and being present in sufficient amount so that (a) the resulting hydrochloric acid has a concentration range of from about 25 to 36%, (b) essentially all the silicon-bonded chlorine atoms are hydrolyzed, and (c) evolution of gaseous HCl is substantially repressed, (2) continuing said introduction of acidified water and methyltrichlorosilane until partial overflow of the formed methylpolysiloxane and acid-containing water is effected, (3) separating the formed methylpolysiloxane and the acid-containing water, (4) recycling the residual acid-containing water substantially free of any silicon composition and diffusing it into the freshly fed acidified water and methyltrichlorosilane introduced into the circulating system.

References Cited in the file of this patent

UNITED STATES PATENTS

| 2,332,527 | Pyzel | Oct. 26, 1943 |
| 2,483,963 | Barry et al. | Oct. 4, 1949 |
| 2,501,525 | Krieble et al. | Mar. 21, 1950 |
| 2,641,589 | Chevalier | June 9, 1953 |